(12) United States Patent
Rosenthal et al.

(10) Patent No.: US 7,228,932 B2
(45) Date of Patent: Jun. 12, 2007

(54) WHEEL END CONDITION DETECTION SYSTEM

(75) Inventors: Robert Rosenthal, Howell, MI (US);
Thomas Sanko, Troy, MI (US);
Charles Smith, Howell, MI (US);
Paula Oakwood, Auburn Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 208 days.

(21) Appl. No.: 10/621,627

(22) Filed: Jul. 17, 2003

(65) Prior Publication Data

US 2005/0011694 A1   Jan. 20, 2005

(51) Int. Cl.
*B60K 28/10* (2006.01)
(52) U.S. Cl. .................................. 180/271
(58) Field of Classification Search ........ 180/170–179, 180/271, 282; 188/1.11 R, 1.11 W, 1.11 L, 188/1.11 E; 303/122–122.15; 340/438–462, 340/500; 384/448, 603, 607
See application file for complete search history.

(56) References Cited

U.S. PATENT DOCUMENTS

| | | | | | |
|---|---|---|---|---|---|
| 3,806,214 | A | * | 4/1974 | Keiser | 384/589 |
| 4,148,271 | A | * | 4/1979 | Majernik | 116/67 R |
| 4,151,655 | A | * | 5/1979 | Makarainen | 33/203.18 |
| 4,798,560 | A | * | 1/1989 | Farrell | 464/178 |
| 5,436,612 | A | * | 7/1995 | Aduddell | 340/438 |
| 5,632,533 | A | * | 5/1997 | Kullmann et al. | 303/122.05 |
| 5,852,330 | A | * | 12/1998 | Yumoto | 290/40 R |
| 5,865,543 | A | * | 2/1999 | MacLean | 384/448 |
| 5,941,335 | A | * | 8/1999 | Krisher | 180/255 |
| 5,954,151 | A | * | 9/1999 | Cochrane et al. | 180/271 |
| 5,959,365 | A | * | 9/1999 | Mantini et al. | 307/10.1 |
| 5,979,612 | A | | 11/1999 | Reid | |
| 6,161,962 | A | * | 12/2000 | French et al. | 384/459 |

(Continued)

FOREIGN PATENT DOCUMENTS

| | | | |
|---|---|---|---|
| CA | 2209158 | A * | 2/1999 |
| DE | 198 27 271 | | 12/1999 |
| EP | 1 559 625 | | 8/2005 |
| JP | 2002079941 | | 3/2002 |

OTHER PUBLICATIONS

European Search Report, Oct. 7, 2005.

*Primary Examiner*—Paul N. Dickson
*Assistant Examiner*—Laura B. Freedman
(74) *Attorney, Agent, or Firm*—Carlson, Gaskey & Olds, PC

(57) ABSTRACT

This invention provides a vehicle axle assembly including a wheel end supported on an axle by bearings. A system uses ABS to detect lateral movement of the wheel end relative to the axle using a sensor and tone ring. A fault code is generated during excessive lateral movement of the wheel end relative to the axle. A wheel end condition detection system activates a warning device in the vehicle cab communicating the severity of the condition to the vehicle operator. Additionally, the system may also communicate with a vehicle control system to limit speed of the vehicle by regulating the vehicle's engine to ensure that the vehicle is not operated at an unsafe speed until the wheel end condition is corrected.

7 Claims, 1 Drawing Sheet

U.S. PATENT DOCUMENTS

| | | | |
|---|---|---|---|
| 6,257,078 B1 * | 7/2001 | Vencill | 73/865.9 |
| 6,517,172 B1 * | 2/2003 | Bond, III et al. | 303/193 |
| 6,789,006 B2 * | 9/2004 | Glock et al. | 701/29 |
| 2001/0030466 A1 * | 10/2001 | Ehrlich et al. | 303/191 |
| 2002/0124926 A1 * | 9/2002 | Colussi et al. | 152/417 |
| 2003/0108262 A1 * | 6/2003 | Bell | 384/585 |

* cited by examiner

WHEEL END CONDITION DETECTION SYSTEM

BACKGROUND OF THE INVENTION

This invention relates to a wheel end condition detection system using an anti-lock braking system (ABS) for identifying a potentially hazardous condition in which a wheel may undesirably separate from an axle during vehicle operation.

Wheel ends including one or more wheels and tires are supported on opposing ends of an axle. Wheel ends are supported by bearings on a hub of the axle. On rare occurrences, one of the components associated with the wheel end may wear or fail, or the wheel end may be improperly installed, and the wheel end may begin to move laterally relative to the axle. Excessive lateral movement may cause the wheel end to become detached from the axle during vehicle operation creating a dangerous condition.

A failure of the bearing supporting the wheel end typically occurs before the wheel end loosens and detaches from the axle. For conventional wheel bearing arrangements, visual warning signs are associated with a failure. For example, the bearing seals will leak providing a visual warning to the operator or vehicle maintenance personnel prior to the wheel end condition deteriorating to the extent that separation of the wheel end may occur. However, unitized bearings do not typically leak at the seals so no such visual warning occurs.

Most modem vehicles utilize ABS for braking of the vehicle. ABS braking systems may detect excessive lateral movement of a wheel end triggering a fault code. The fault code generates an ABS warning light in the vehicle cab indicating to the driver that there is a problem with the ABS. However, the vehicle operator has no indication as to the nature or severity of the ABS failure. In the case of a fault code generated by excessive wheel end movement, the vehicle operator may continue to operate the vehicle assuming that the vehicle ABS may be serviced at his convenience. As a result, during continued operation of the vehicle the wheel end may detach from the axle resulting in a dangerous condition.

Therefore, what is needed is a wheel end condition detection system that conveys a visual warning to the vehicle operator or maintenance personnel while ensuring safe operation of the vehicle until the wheel end condition is corrected.

SUMMARY OF THE INVENTION AND ADVANTAGES

This invention provides a vehicle axle assembly including a wheel end supported on an axle by bearings. The wheel end may include a tone ring or similar device associated with a hub of the wheel end. A sensor may be mounted on the axle by a bracket. The sensor is located proximate to the tone ring to detect rotation of the wheel end to modulate braking of the wheel end. The ABS may also detect lateral movement of the wheel end relative to the axle using the sensor and tone ring. A fault code is generated during excessive lateral movement of the wheel end relative to the axle In an example embodiment, the present invention wheel end condition detection system may activate a warning device in the vehicle cab in addition to illuminating an ABS warning light to communicate the severity of the condition to the vehicle operator. Additionally, the detection system may also communicate with a vehicle control system to limit the vehicle speed by regulating the engine to ensure that the vehicle is not operated at an unsafe speed until the wheel end condition is corrected.

Accordingly, this invention provides a wheel end condition detection system that conveys a visual warning to the vehicle operator or maintenance personnel while ensuring safe operation of the vehicle until the wheel end condition is corrected.

BRIEF DESCRIPTION OF THE DRAWINGS

Other advantages of this invention can be understood by reference to the following detailed description when considered in connection with the accompanying drawings wherein.

DETAILED DESCRIPTION OF THE PREFERRED EMBODIMENT

Figure 1:
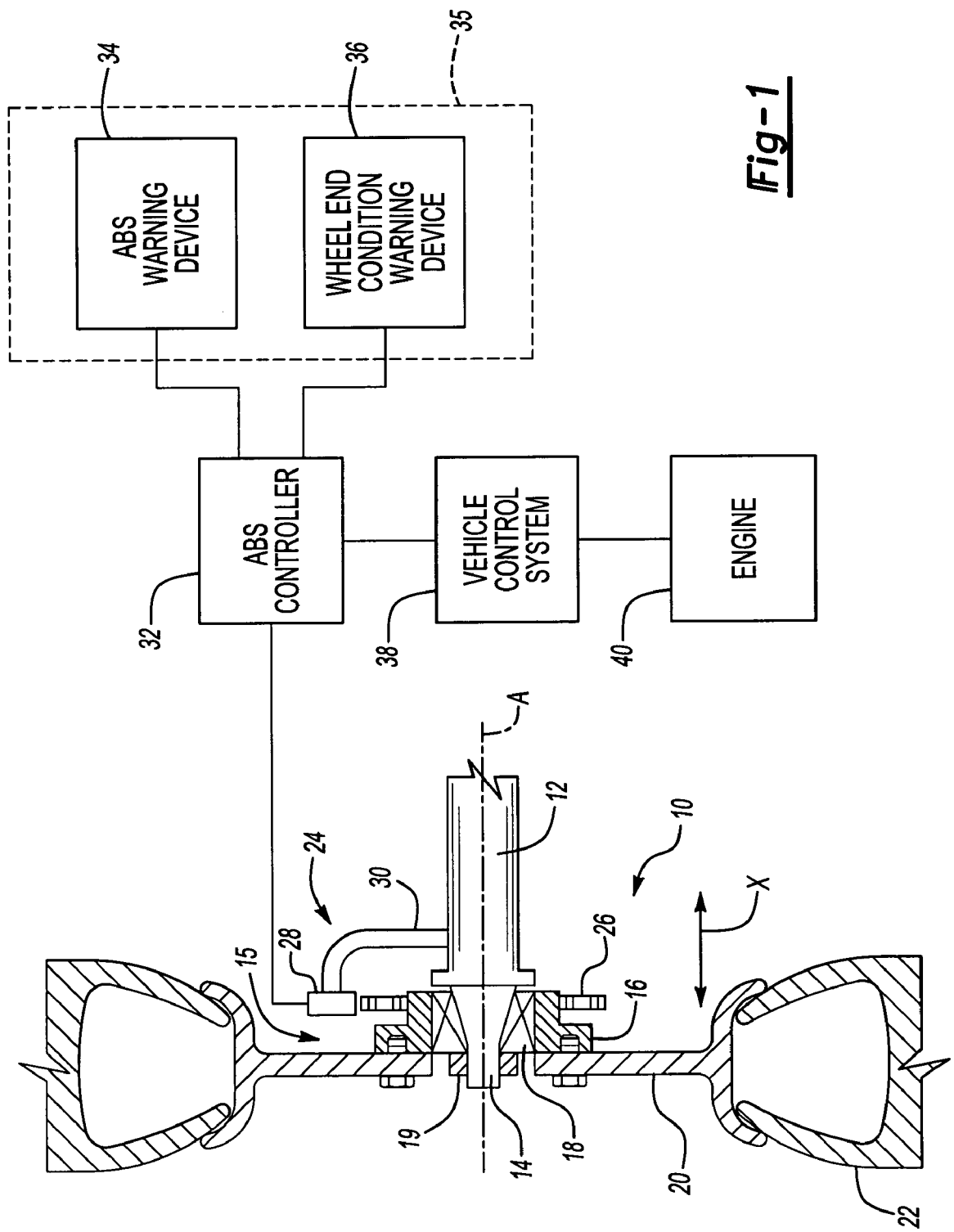
FIG. 1 is a schematic view of one example of this inventive wheel end condition detection system.

A vehicle axle assembly 10 is schematically shown in FIG. 1. The assembly 10 includes an axle 12 having a spindle 14. The wheel end assembly 15 includes a hub 16 supported on the spindle 14 by bearings 18. A wheel 20 is secured to the hub 16 by fasteners, and the wheel 20 supports a tire 22 for rotation about an axis A. The wheel end assembly 15 is retained on the axle 12 by a nut 19 or any other suitable configuration, as is known in the art.

Although a non-drive, non-steer axle arrangement is shown, it is to be understood that this invention may be used with drive axles, steer axles and trailer axles. It will also be understood by one of ordinary skill in the art that other wheel end configurations may be used with this invention.

The vehicle axle assembly 10 also includes an ABS assembly 24, as is well known in the art, for detecting the rotation of the wheel end assembly 15 for use during braking and other vehicle maneuvers. The ABS assembly 24 may include a tone ring 26 associated with the wheel end assembly 15. For example, the tone ring 26 may be mounted onto the hub 16 for rotation with the hub 16. The tone ring 26 may include notches about its circumference that indicate the wheel end rotational speed and other information, as is known in the art. The ABS assembly 24 includes a sensor 28 mounted on the axle 12 by a bracket 30. The sensor 28 is mounted proximate to the tone ring 26 to detect the rotation of the wheel end assembly 15 by magnetically "reading" the notches as they pass the senor 28, as is known in the art.

The vehicle axle assembly 10 also includes an ABS assembly 24, as is well known in the art, for detecting the rotation of the wheel end assembly 15 for use during braking and other vehicle maneuvers. The ABS assembly 24 may include a tone ring 26 associated with the wheel end assembly 15. For example, the tone ring 26 may be mounted onto the hub 16 for rotation with the hub 16. The tone ring 26 may include notches about its circumference that indicate the wheel end rotational speed and other information, as is known in the art. The ABS assembly 24 includes a sensor 28 mounted on the axle 12 by a bracket 30. The sensor 28 is mounted proximate to the tone ring 26 to detect the rotation of the wheel end assembly 15 by magnetically "reading" the notches as they pass the sensors 28, as is known in the art.

An ABS controller 32 is connected to the sensor 28 for detecting information useful for the ABS and other vehicle control systems. For example, the ABS controller 32 may detect excessive lateral movement of the wheel end assembly 15 relative to the axle 12 and trigger a fault code indicating that the sensor 28 is Out of lateral alignment with the tone ring 26. Excessive lateral movement may be evident from a deteriorating electrical signal from the sensor 28, for example. The ABS controller 32 may activate an ABS warning device 34 in the vehicle cab 35, such as illuminating an ABS warning light The ABS controller 32 may be integrated with other system controllers.

The ABS warning light is intended to prompt the vehicle operator to seek a service or maintenance technician to correct the ABS. However, the ABS warning device 34 typically does not convey the urgency of the problem within the ABS, and therefore, the vehicle may operator may continue to drive the vehicle unfit a failure occurs, for example, until the wheel end assembly 15 becomes detached from the axle 12. To this end, this invention incorporates additional warning devices and controls in ensure sufficient waning to the vehicle operator and continued safe operation of the vehicle until the ABS is properly serviced.

Excessive lateral movement of the wheel end assembly 15 relative to the axle 12 may occur for example, as a result of failing bearings 18. In the case of a unitized bearing, the bearing failure may not be apparent to the vehicle operator or service technician. The sensor 28 detects excessive lateral movement of the wheel end in the direction X as the tone ring 26 moves laterally relative to the sensor 28. When the lateral movement X reaches a predetermined value, the ABS controller 32 will register a fault code and illuminate a conventional ABS warning device 34, such as an ABS warning light in the vehicle cab 35. Instead of, or in addition to the warning device 34, the ABS controller 32 may also activate a wheel end condition warning device 36 in the vehicle cab 35. The wheel end condition warning device 36 may be an audio and/or visual warning that conveys a clear message to the vehicle operator as to the nature and severity of the wheel end condition. As a result, the vehicle operator will more likely seek prompt service of the ABS.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A wheel end condition detection system comprising:
   a wheel end assembly;
   a controller detecting lateral movement of said wheel end assembly and generating a fault code in response to said lateral movement reaching a predetermined value;
   an anti lock brake system (ABS) sensor connected to said controller for sensing said lateral movement;
   a warning device activated in response to said fault code, wherein said warning device includes an ABS warning light; and
   a vehicle component other than said warning device in electrical communication with said controller that is controlled in response to said fault code for maintaining safe operation of a vehicle.

2. The system according to claim 1, wherein said wheel end assembly includes a unitized bearing.

3. The system according to claim 1, including a second warning device activated in response to said fault code.

4. A wheel end condition detection system comprising:
   a wheel end assembly;
   a controller detecting lateral movement of said wheel end assembly and generating a fault code in response to said lateral movement reaching a predetermined value;
   an anti lock brake system (ABS) sensor connected to said controller for sensing said lateral movement;
   a warning device that includes an ABS warning light that is activated in response to said fault code; and
   a wheel end condition warning device that is controlled in response to said fault code for maintaining safe operation of a vehicle.

5. A method of detecting a wheel end condition comprising the steps of:
   (a) providing a wheel end;
   (b) detecting lateral movement of the wheel end;
   (c) limiting vehicle speed in response to the lateral movement reaching a predetermined value; and
   (d) generating a fault code in response to the lateral movement reaching the predetermined value, including generating the fault code in response to a deteriorating electrical signal from a sensor that detects the lateral movement.

6. The method according to claim 5, wherein step (c) includes limiting the vehicle speed in response to the fault code.

7. A method of detecting a wheel end condition comprising the steps of:
   (a) providing a wheel end;
   (b) detecting lateral movement of the wheel end between a sensor and a tone ring on the wheel end, wherein the sensor magnetically interacts with the tone ring to detect the lateral movement of the wheel end; and
   c) limiting vehicle speed in response to the lateral movement reaching a predetermined value.

* * * * *